Thomas V. McLane.
Tedder.
No. 105,141
Patented July 5, 1870.
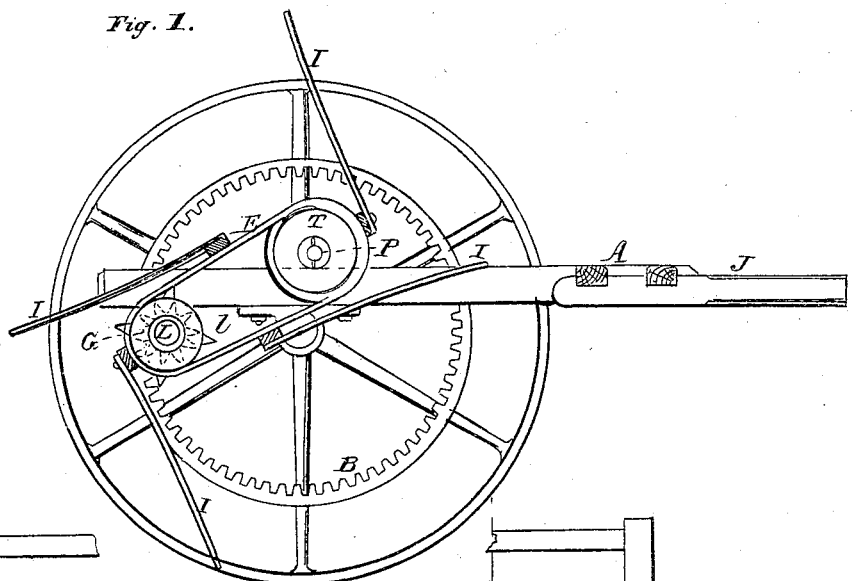
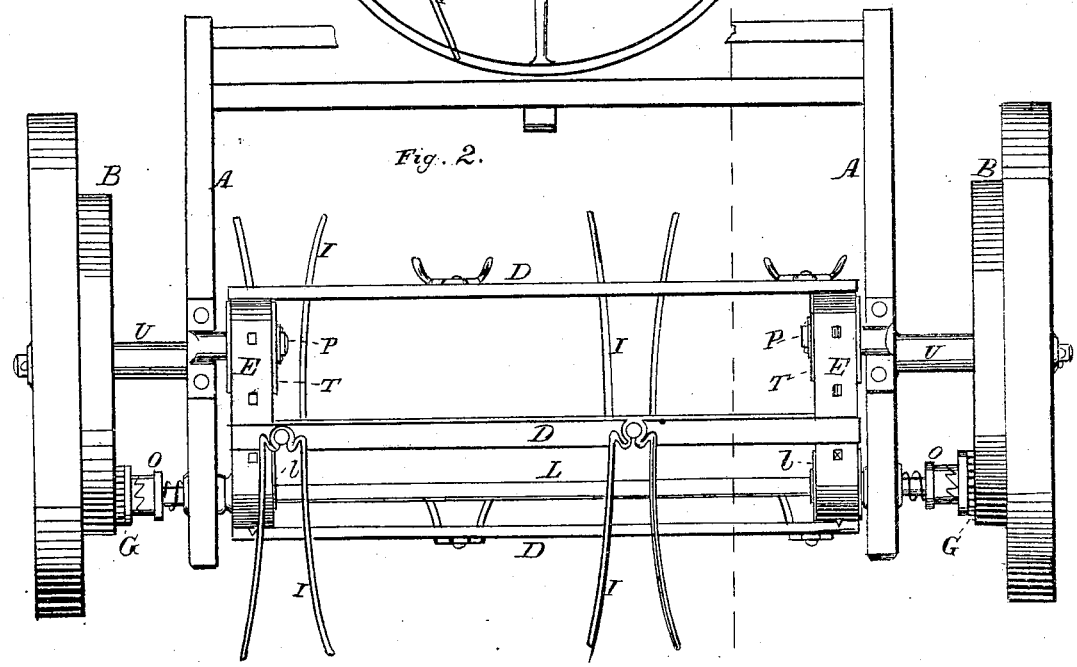
Witnesses:
L. Hailer
Phil. T. Dodge
Inventor:
J. F. Thomas &
H. D. McLane
by Dodge & Munn
their Attys.

United States Patent Office.

JOHN F. THOMAS AND DANIEL H. McLANE, OF ILION, NEW YORK.

Letters Patent No. 105,141, dated July 5, 1870.

IMPROVEMENT IN HAY-SPREADERS.

The Schedule referred to in these Letters Patent and making part of the same

*To all whom it may concern:*

Be it known that we, JOHN F. THOMAS and DANIEL H. McLANE, of Ilion, in the county of Herkimer and State of New York, have invented certain Improvements in Hay-Tedders, of which the following is a specification, reference being had to the accompanying drawing.

Our invention relates to hay-tedders; and

It consists in providing a rigid frame, mounted on wheels, with pulleys, having mounted thereon endless belts or chains, having bars attached thereto, with teeth or arms attached to said bars in such a manner that they shall project backward therefrom in the plane of their line of travel, whereby they are made to operate in a peculiar and very efficient manner.

Figure 1 is a longitudinal section taken on the line x–x of fig. 2.

Figure 2 is a top plan view.

In constructing our tedder, we make a rectangular frame consisting of two side-bars, A, connected at the front by two cross-bars, the tongue J being secured to the latter, as represented in the drawing. This frame we mount on two wheels by means of short axles, U, bolted fast, one on each side, as shown in fig. 2, and on the inner face of each wheel is secured an internal gear-rim, B, as shown in figs. 1 and 2.

Across the rear end of the main frame we mount a shaft, L, which extends out at each side of the frame, and has mounted on it at each end a pinion, G, arranged to gear into the wheels B, the pinion G being loose on the shaft and held by a spring-clutch, o, in such a manner that, as the machine moves forward, the shaft L will be caused to revolve; but whenever either or both wheels are moved in the reverse direction, the clutches o will be disengaged, and the pinions allowed to revolve loosely on the shaft.

Upon this shaft L, just inside of the side-bars A, we mount sprocket-wheels, l, one on each side, and in front of them, just over or in front of the axles, we secure on each side an inwardly-projecting journal, P, on which we mount a corresponding pair of wheels or pulleys, T, as represented more clearly in fig. 1.

Around each pair of wheels l and T, we pass a belt or chain, E, and to these belts we secure a series of bars, D, having arms or prongs I attached to the bars in such a manner as to cause them to project backward therefrom, in a plane corresponding with their line of movement, as shown in the drawing, these arms being of such a length that, as they pass around under the shaft L, their lower ends shall sweep the ground, or come in close proximity thereto, so as to gather up the grass and throw or scatter the same in rear of the machine.

By this construction and arrangement of the machine, we are enabled to produce an exceedingly simple and cheap machine, and one that is peculiarly well adapted to the purpose for which it is designed. By this method of operating the arms, it will be perceived that they have imparted to them a peculiar movement, quite different from that of arms attached to a rotating wheel or reel, as is usually the case in machines of this kind. While passing along the space between the front and rear wheels, the arms will remain in a uniform position, and will move bodily through the space at a uniform rate; but when they pass around the pulley or wheels T or l, their outer ends will move suddenly through the arc of a circle, the center of which will be co-incident with the center of the axis of the wheel or pulley around which they are moving, and as this occurs just as the arms I arrive at the end of their backward movement, their points are thrown suddenly backward and upward, and thus scatter and spread the grass in a most thorough and effectual manner. At the same time, as they deliver the grass, they are drawn forward, and, as it were, from under the grass, thereby preventing the possibility of any portion of it from being carried or thrown over forward.

Having thus described our invention,

What we claim is—

1. A hay-tedder, consisting of a rigid frame, A, mounted on wheels, and provided with pulleys T l, having mounted thereon endless belts or chains E, carrying bars D, which latter have arms I, secured to them in such a manner as to cause them to project backward in the line of their movement, substantially as described.

2. The arms I secured to the bars D, substantially in the manner described, so as to cause them to project backward in line with the path of their movement, whereby their outer ends are thrown suddenly backward and upward to scatter the grass, and are then drawn forward from under the grass, substantially as described.

JOHN F. THOMAS.
DANIEL H. McLANE.

Witnesses:
WM. BRIGGS,
W. H. THOMAS.